May 28, 1968  J. W. KLOCK  3,385,786
SYSTEM FOR BIOLOGICAL TREATMENT OF SEWAGE
Filed Oct. 28, 1966  5 Sheets-Sheet 1

INVENTOR
JOHN W. KLOCK
BY
ATTORNEYS

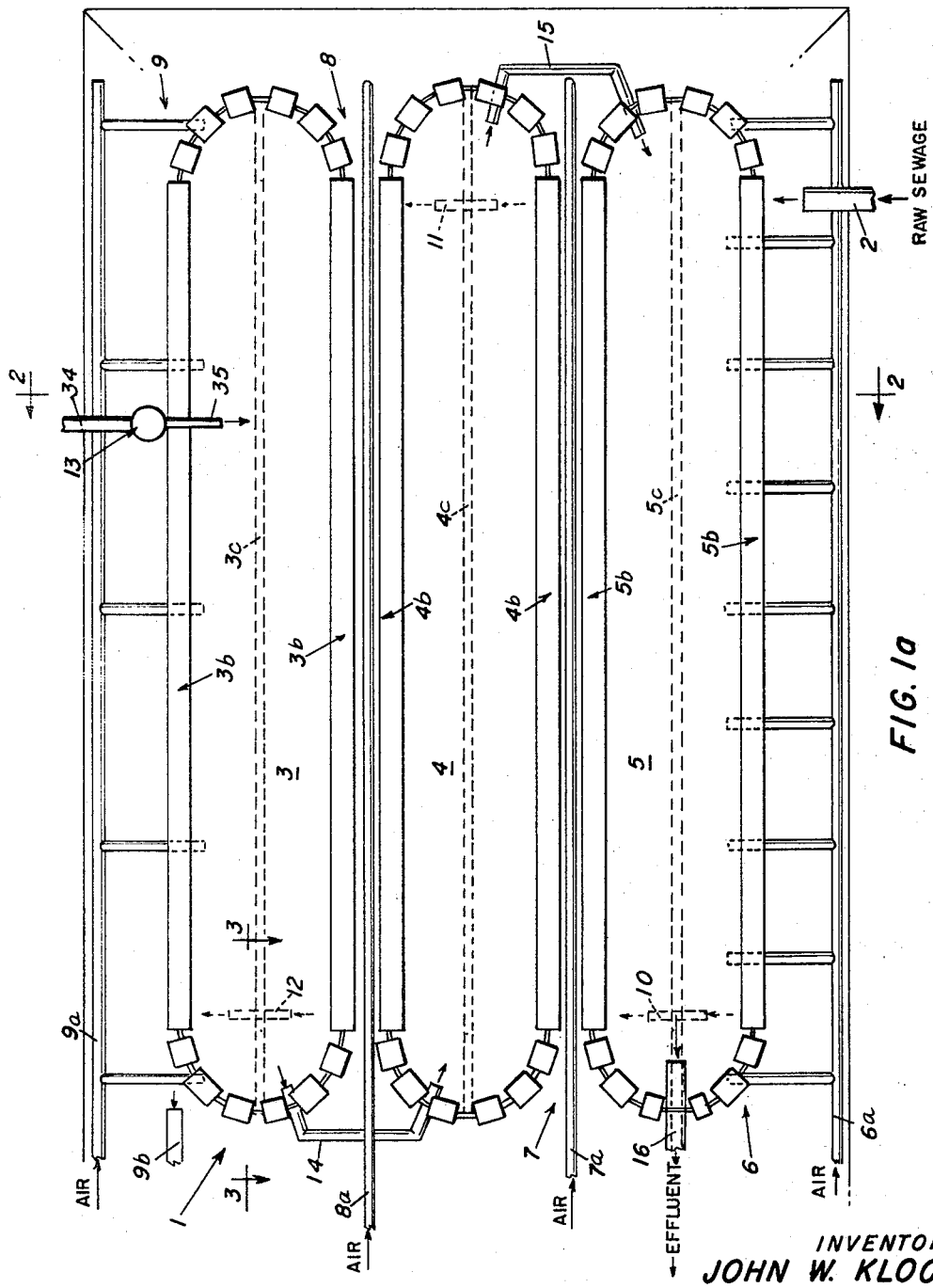

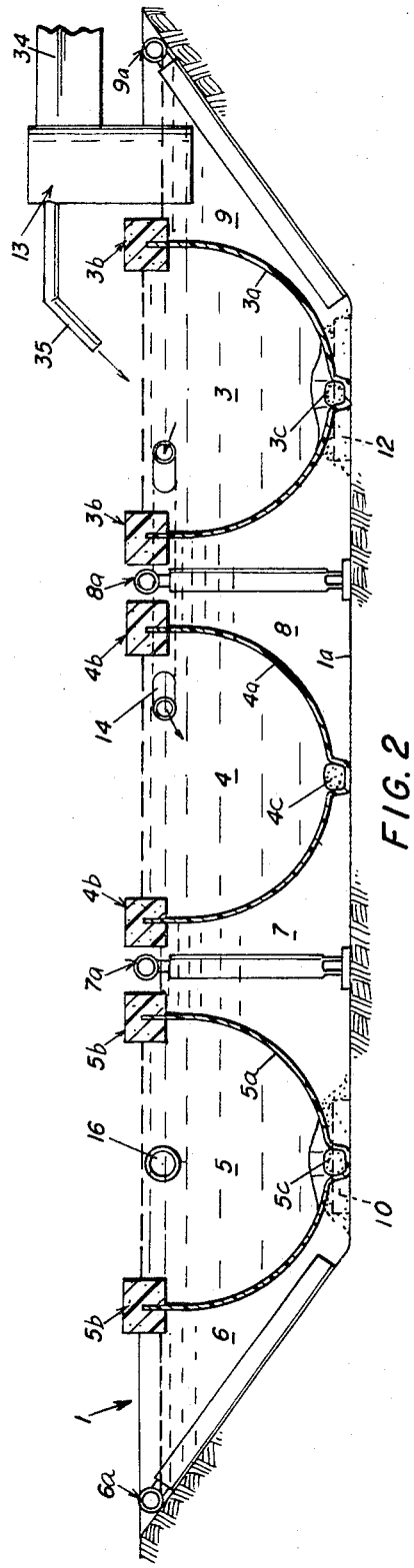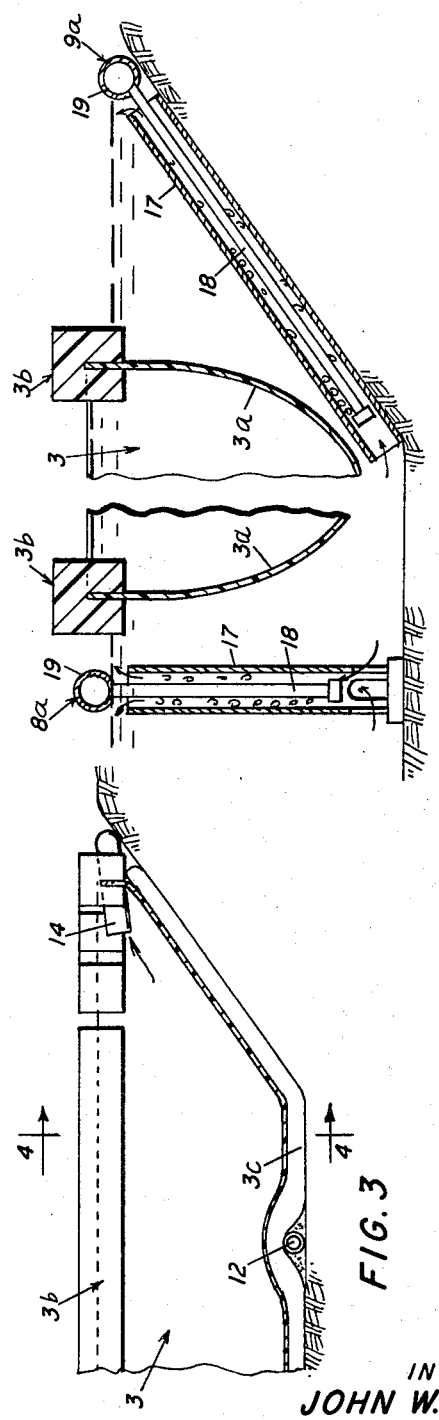

May 28, 1968     J. W. KLOCK     3,385,786
SYSTEM FOR BIOLOGICAL TREATMENT OF SEWAGE
Filed Oct. 28, 1966     5 Sheets-Sheet 4

INVENTOR
JOHN W. KLOCK
BY Ernest S. Cohen
M. Howard Silverstein
ATTORNEYS

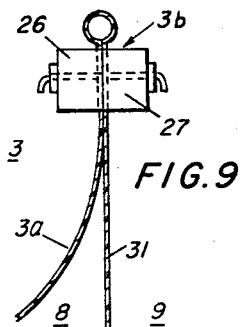
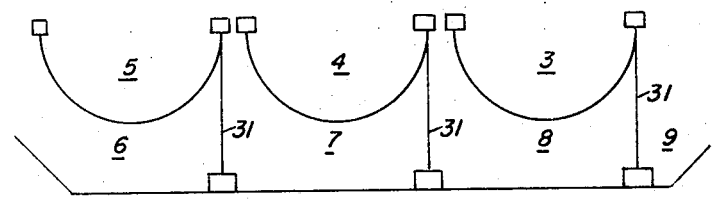
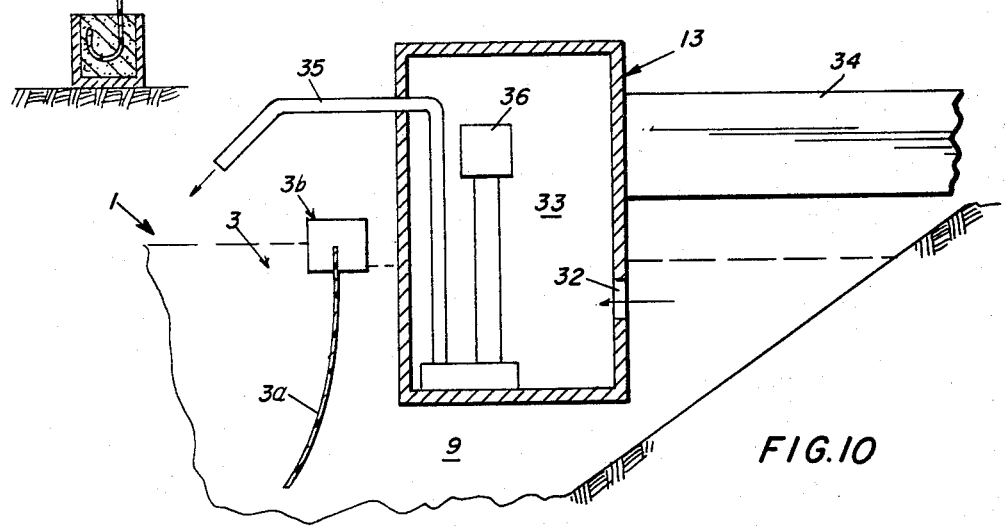
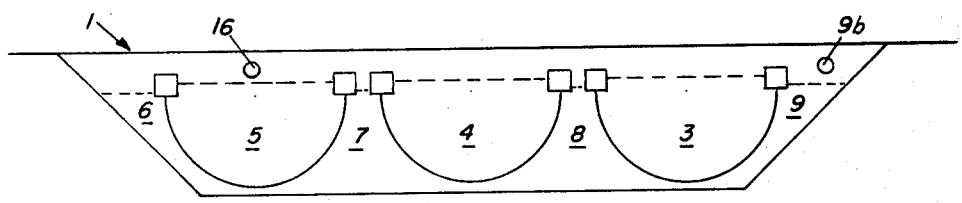
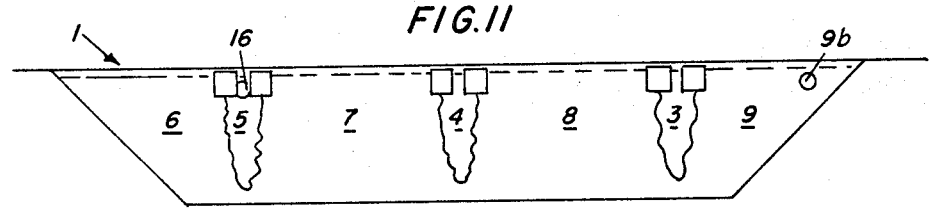
INVENTOR
JOHN W. KLOCK

United States Patent Office 3,385,786
Patented May 28, 1968

3,385,786
SYSTEM FOR BIOLOGICAL TREATMENT
OF SEWAGE
John W. Klock, Tempe, Ariz., assignor to the United States of America as represented by the Secretary of the Interior
Filed Oct. 28, 1966, Ser. No. 591,053
18 Claims. (Cl. 210—12)

ABSTRACT OF THE DISCLOSURE

Sewage is first passed through a serpentine path for anaerobic digestion, and then through a serpentine trough floating on the sewage in the anaerobic digestion zone. In the floating trough the sewage is exposed to light and aerobic digestion to promote the growth of algae.

---

This invention relates to the reclamation of sewage by biological treatment.

Presently, one of the techniques employed for disposing of domestic and industrial sewage involves biologically decomposing undesirable waste materials within the sewage while simultaneously cultivating the growth of algae from the decomposition products. Algae can later be used in the production of food. In this system aerobic and anaerobic micro-organisms within the sewage are allowed to break down organic and inorganic matter, some of the products serving as nutrient for the growth of algal cells by photosynthesis. A symbiosis is established between the algae and aerobic micro-organisms; the algae consuming carbon dioxide and giving off oxygen, the areobic micro-organisms consuming oxygen and giving off carbon dioxide.

The systems heretofore utilized to carry out this above technique suffer from many disadvantages including the following:

(a) Energy, including heat, within the system is not efficiently employed;

(b) Photosynthetic and anaerobic activity are not maximized.

I have now devised a system overcoming these and other disadvantages wherein the micro-organisms which are active in the absence of free oxygen are allowed to break down the matter in the sewage in a zone separate from the zone wherein photosynthesis occurs and wherein the micro-organisms which are active in the presence of free oxygen are allowed to break down sewage matter. Furthermore, these two zones are maintained in heat exchange relationship with one another to efficiently employ energy within the system.

It is therefore an object of this invention to provide a system for maximizing biological decomposition of sewage by anaerobic micro-organisms.

Another object is to maximize photosynthesis.

A further object is to provide a system for maximizing the heat contained within the sewage to destroy undesirable organisms and enhance photosynthesis.

A still further object is to provide a system for efficiently decomposing sewage in a minimum amount of time in a minimum lagoon area.

Figure 1:
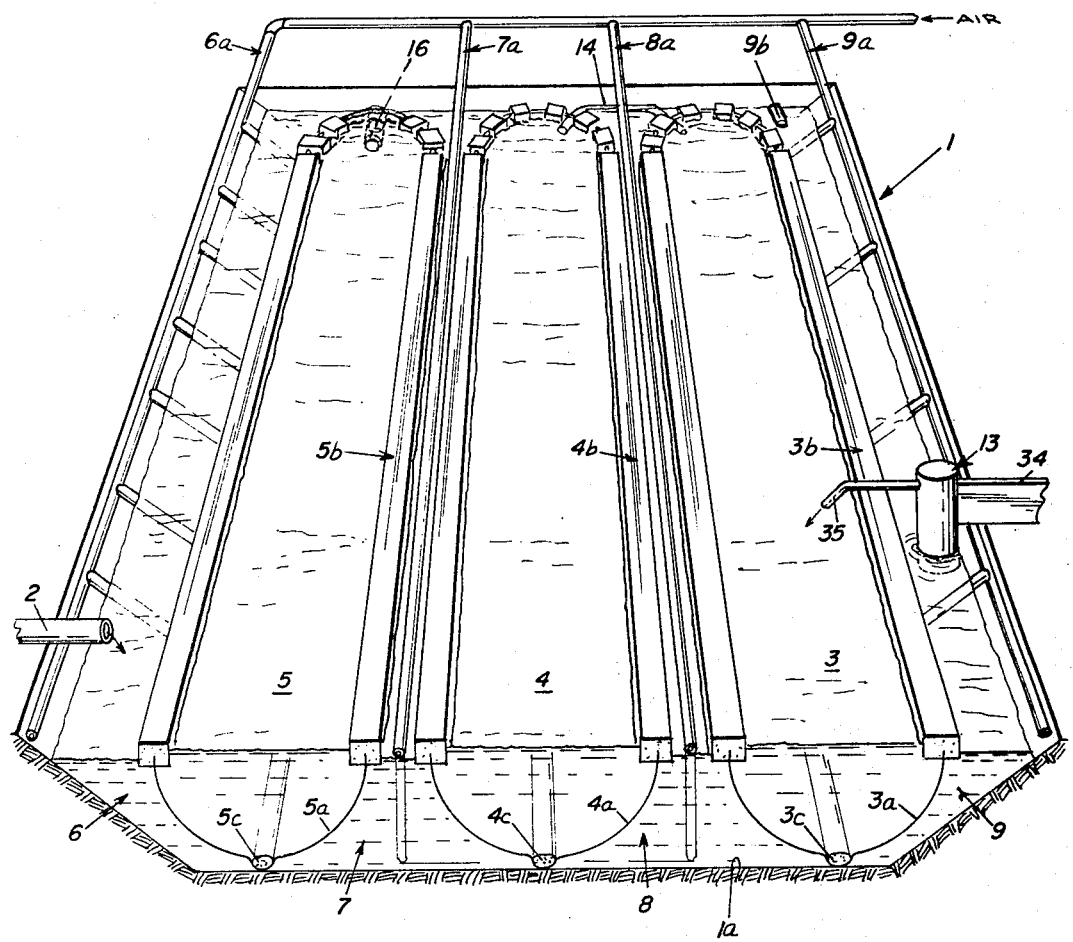
Figure 5:
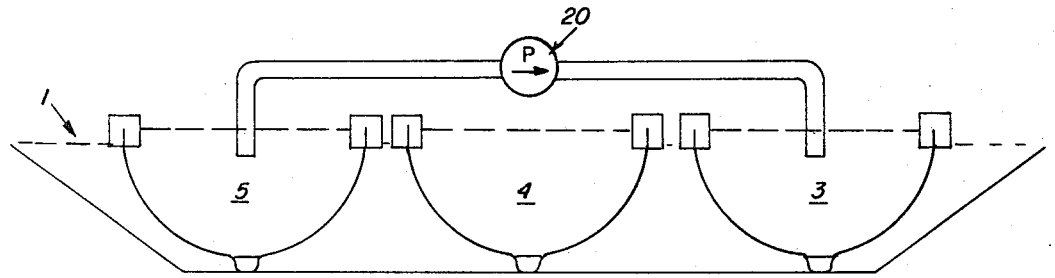
Figure 6:
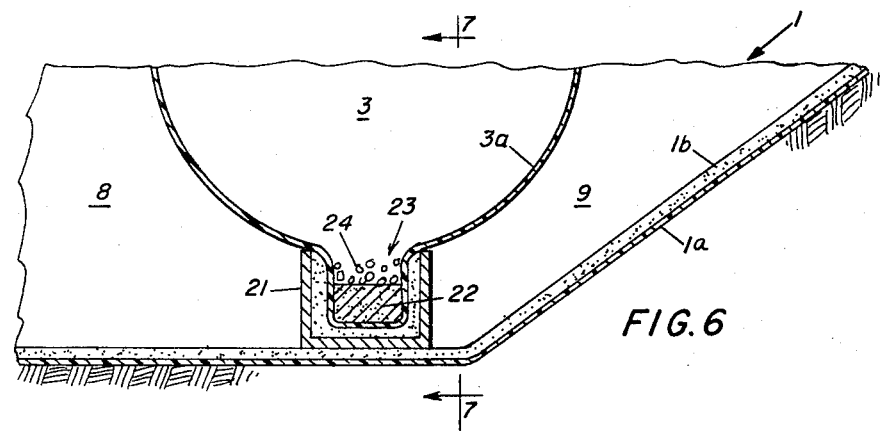
Figure 7:
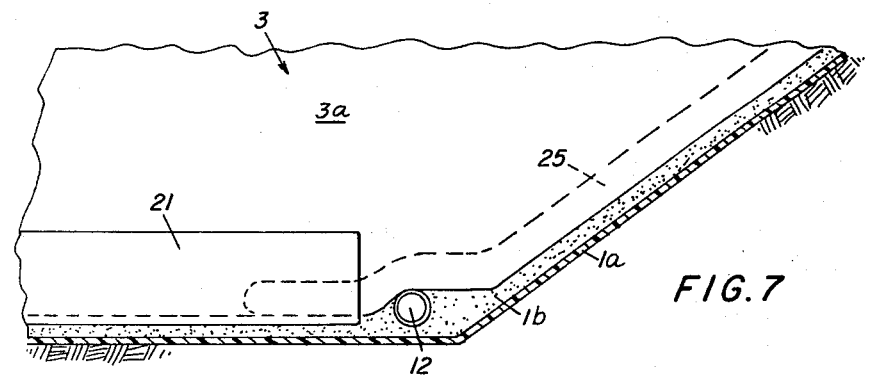
Figure 8:
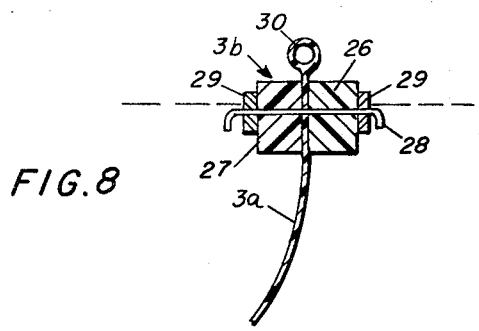

Other objects and advantages of the system will be obvious from the detailed description of the process appearing in the specification taken in conjunction with the following drawings in which:

FIG. 1 is a fragmentary perspective view of the system;
FIG. 1a is a top view of the system;
FIG. 2 is a cross-sectional view along line 2—2 of FIG. 1a;
FIG. 3 is a fragmentary cross-sectional view along line 3—3 of FIG. 1a;
FIG. 4 is a fragmentary cross-sectional view along line 4—4 of FIG. 3;
FIG. 5 is a schematic view of a modification;
FIG. 6 is a fragmentary cross-sectional view to show details of construction;
FIG. 7 is a fragmentary cross-sectional view along line 7—7 of FIG. 6;
FIG. 8 is a fragmentary cross-sectional view to show details of construction;
FIG. 9 is a fragmentary cross-sectional view of an alternative embodiment;
FIG. 9a is a schematic view of the system with the alternative embodiment of FIG. 9;
FIG. 10 is a fragmentary cross-sectional view to show details of construction;
FIGS. 11 and 11a are schematic views of one system showing the effects of pump failure.

Referring to FIGS. 1–3, warm sewage is introduced into a ground basin 1 at one side by a conduit 2. A plurality of elongated, parallel floating troughs 3, 4 and 5 partition the basin into a plurality of elongated, parallel channels 6, 7, 8 and 9, as best shown in FIG. 2. Flexible plastic walls 3a, 4a and 5a suspended from floating means 3b, 4b and 5b, respectively, define the troughs. A .008" plastic trough wall made of, for example, polyethylene or polyvinyl chloride, provides suitable flexibility. Weights 3c, 4c, and 5c within the troughs 3, 4 and 5, respectively, secure the troughs to the floor and also to the sides (FIG. 3) of the basin 1 so that the troughs partition the basin into channels 6, 7, 8 and 9. Conduits 10, 11, and 12, shown in FIGS. 1a and 2, submerged in sand at alternate ends of the channels connect the channels in a manner to allow sewage influent to flow in a serpentine path through the basin 1 while conduits 14 and 15 allow countercurrent serpentine flow through the troughs. An overflow conduit 9b (FIGS. 1 and 2a) embedded in a side of the basin is provided in channel 9 to control the upper level of sewage therein.

During travel through the channels 6, 7, 8 and 9, sewage is protected from light and air by the overlying elongated troughs 3, 4 and 5 which cover a substantially major portion of the sewage. Specifically, the overlying troughs prevent premature photosynthesis, reduce heat loss, prevent evaporation of sewage water and enable control of aeration of the sewage in channels 6, 7, 8 and 9 to allow predominantly anaerobic activity in the channels. Controlled amounts of air can thus be introduced into the channels through air injection conduits 6a, 7a, 8a and 9d to minimize esthetic problems by oxidizing such undesirable anaerobic activity products as $H_2S$, but not enough air is introduced to produce a dissolved oxygen residual which would effect substantial aerobic activity. Air injection also mixes the contents in the anareobic phase to achieve improved biological activity, heat transfer and insect destruction. Micro-organisms in the sewage which are active in the absence of free oxygen (e.g., anaerobic micro-organisms and facultative organisms) are thereby allowed to carry on their decomposition of waste materials in the sewage in the channels 6, 7, 8 and 9 to produce a maximum amount of soluble product which remains in solution as a result of a low solution pH. During later travel of the sewage through the exposed troughs 3, 4, and 5, some of this soluble product serves as nutrient for the growth of algal cells through photosynthesis.

After the influent has travelled the length of the last channel 9, a pumping mechanism 13 delivers it to trough 3. Connecting conduits 14 and 15 at alternate ends of the troughs allow the sewage to flow through the troughs in a serpentine manner. Micro-organisms in the sewage which are active in the presence of free oxygen (aerobic micro-organisms) further decompose waste material in the sewage in the exposed troughs while an algae-aerobic bacteria symbiosis is established. Algae-containing effluent is removed from trough 5 by a discharge conduit 16 embedded in a side of the basin. Algae can then be separated from the effluent, or the algae-containing effluent can be used directly for irrigation purposes since algae is an agricultural nutrient.

Flow rates through the two zones of operation ((1) anaerobic; (2) aerobic-photosynthetic) are adjusted to destroy by heat a maximum amount of undesirable enteric micro-organisms including coliform and virus. Destruction of undesirable micro-organisms in the second zone is aided by the conservation of influent sewage heat which is transferred to the second zone during the flow of sewage through the first zone in a generally counter-current manner to the flow through the second zone. This heat transfer also enhances algae growth. Maximum heat transfer between the zones is established by properly dimensioning the plastic trough wall material. Likewise, the wall dimensions are such as to expose a large area of the sewage in the aerobic-photosynthetic zone to light and air. By employing black-colored trough walls, the radiant energy of the surrounding environment is more efficiently utilized.

Referring to FIG. 4, the details of construction of air injection conduits 6a, 7a, 8a and 9a are shown. Each conduit comprises air lift ducts 17 made of, for example, galvanized metal or polyethylene plastic which are employed at a plurality of locations geometrically spaced along the bottom and sides of the channels to control the degree of anaerobic activity, channel 6 having the shortest spacing between ducts. Air is led to the bottom of each channel by tubes 18 extending through each duct from above the level of sewage in the channels. Air under pressure can then be supplied by suitable means to the galvanized or plastic air manifolds 19 attached to the tubes 18.

As shown in the modification of FIG. 5, to enhance the formation of algae, a portion of the algae-containing effluent leaving trough 5 is recirculated by suitable conduit and pumping means 20 to the first trough 3 whereby a seeding of the first trough with an algae culture takes place. By algae seeding, a minimum amount of time is required to produce maximum amounts of algal cell tissue thereby avoiding respiration losses.

Referring to FIG. 6 for more details of construction, basin 1 contains a plastic (e.g., polyethylene or polyvinyl chloride) membrane 1a along its floor and sloping sides to prevent seepage into the ground, and a thin layer of sand 1b to hold the membrane down. Each of trough weights 3c, 4c and 5c can be constructed of an elongated sand filled wooden box 21 resting on the basin floor along the length of each trough. Sand 22 buries a small portion of the bottom of each wall in the sand box and creates a wall indentation 23 to receive sewage, trash and sediment 24. As shown in FIG. 7, the trough weights at the sloping sides of the basin can be constructed of a polyethylene, sand filled tube 25 extending from the end of each sand box 21.

In FIG. 8 are shown the details of a floating means that can be employed in the system of the present invention. Suspension of a trough, in this case trough 3, is achieved by sandwiching the trough walls 3a between plastic floats 26 and 27 made of foamstyrene or wood. A stainless steel wire 28 attached to the floats by, for example, wooden or plastic washers 29, along with a rope or hollow polyethylene tube 30 attached to the edges of each wall, maintains the walls in a sandwiched position.

As shown in FIGS. 9 and 9a, an alternative arrangement for partitioning the basin into channels could be a plastic partition 31 made of trough wall material secured in the float sandwich on one side of each trough, and secured to the floor and sides of the basin by a sand box arrangement.

In FIG. 10 is shown a pumping mechanism for raising the sewage from the last channel 9 to the first trough 3. Liquid from the last channel passes through an adjustable orifice 32 such as a butterfly or sliding gate valve on the pumping chamber 33 which is maintained in position by a cantilever beam 34 projecting over the basin from the adjacent ground surface. Sewage is then pumped through vertically adjustable, discharge pipe 35 to the trough by way of a conventional pump 36. Pipe 35 can be a swinging arm pipe, a telescoping pipe or flexible tubing (e.g., polyvinyl chloride). By alternating the height of the discharge pipe 35 or the size of orifice 32, the rate of discharge into the trough can be regulated.

Referring to FIG. 11, failure of the influent pump results in a lowering of the surface level of the anaerobic phase to prevent discharge of the algae phase since the floating troughs are lowered below the opening of the effluent discharge conduit embedded in a side of the basin. As shown in FIG. 11a, failure of the trough-channel pump 36 to pump sewage into the trough results in a raising of the level of the anaerobic phase to the point of overflow through the anaerobic overflow conduit 9b which is embedded in a side of the basin. Simultaneously, most of the sewage in the troughs discharges through the effluent conduit, the trough walls thereby collapsing.

Due to the channeling arrangement in the system of the present invention, wastes cannot move directly to the effluent pipe and be prematurely wasted before receiving adequate treatment. Since all wastes are held a constant period of time by such channeling, and the air mixing in the anaerobic phase results in controlled, stable metabolic activity, shorter lagoon detention times can be employed with assurance that a uniform and high degree of treatment will still be achieved. It can thus be seen that the system provides for greater throughputs of liquid and organic wastes per square foot of lagoon area per unit of time than previously employed lagoon systems.

While the particular system herein described is well adapted to carry out the objects of the present invention, it is to be understood that various modifications and changes may be made all coming within the scope of the following claims.

What is claimed is:
1. An apparatus for reclaiming sewage comprising:
  (a) a basin to receive said sewage, said basin exposed to free oxygen and light;
  (b) means to feed sewage to a first side of said basin;
  (c) means to withdraw sewage from a second side of said basin;
  (d) elongated trough means overlying a major portion of said sewage in said basin to protect said sewage from substantial exposure to said free oxygen and light; said trough means comprising floating means on said sewage in said basin, and flexible trough walls attached to said floating means;
  (e) means connected to said basin sewage withdrawal means to deliver said sewage to said trough means; and
  (f) means to discharge treated sewage from said trough means.

2. The apparatus of claim 1 wherein said trough walls are heat conducting.

3. The apparatus of claim 2 further including means to inject controlled amounts of air into said sewage in said basin.

4. The apparatus of claim 2 wherein said sewage withdrawn from said second side of said basin is delivered to the portion of said trough means adjacent said second side, and wherein said treated sewage in said trough means is discharged from the portion of said trough means adjacent said first side of said basin whereby said sewage in said trough means flows generally counter-current to said sewage in said basin.

5. Apparatus of claim 2 wherein said trough walls are constructed of black plastic material.

6. The apparatus of claim 2 wherein said means to withdraw said sewage from said basin and deliver it to said elongated trough means comprises:

(a) a fixedly supported pumping chamber extending into said sewage in said basin adjacent said second side, said pumping chamber having an adjustable orifice means to allow sewage to flow from said basin into said chamber;

(b) a vertically adjustable discharge conduit on said chamber to direct sewage from said chamber into said portion of said trough means adjacent said second side;

(c) a pump within said chamber to force sewage within said chamber through said discharge conduit.

7. The apparatus of claim 4 further including means to inject controlled amounts of air at a plurality of locations in the lower portion of said basin.

8. The apparatus of claim 4 further including means to divide said basin into a plurality of substantially parallel, elongated channels, said channels being connected to one another in a manner to allow said sewage in said basin to flow therethrough in a serpentine path from said first side to said second side, and wherein said elongated trough means comprises a plurality of substantially parallel elongated troughs connected to one another in a manner to allow said sewage in said trough means to flow therethrough in a serpentine path from said portion of said trough means adjacent said second side of said basin to said portion of said trough means adjacent said first side.

9. The apparatus of claim 8 wherein said elongated trough means includes said means to divide said basin into said plurality of elongated channels.

10. The apparatus of claim 9 wherein said means to divide said basin into a plurality of channels comprises partition means connected to said floating means and secured to the floor and sides of said basin.

11. The apparatus of claim 10 further including means to inject air at a plurality of locations in the lower portion of said basin.

12. The apparatus of claim 9 wherein said means to divide said basin into channels comprises the lower section of each elongated trough being secured to the basin floor along the length of each trough, and each end of each trough being secured to a side of said basin.

13. The apparatus of claim 12 further including means to inject air at a plurality of locations in the lower portion of said basin.

14. The apparatus of claim 13 further including means to recycle sewage from the most downstream trough of said plurality of troughs to the most upstream trough; further wherein said trough walls are constructed of a black plastic material; and further wherein one of said channels includes an overflow conduit to maintain a maximum sewage level in said basin.

15. The apparatus of claim 14 wherein said means to withdraw said sewage from said basin and deliver it to said trough means comprises:

(a) a fixedly supported pumping chamber extending into said sewage in said basin adjacent said second side, said pumping chamber having an adjustable orifice means to allow sewage to flow from said basin into said chamber;

(b) a vertically adjustable discharge conduit on said chamber to direct sewage from said chamber into said portion of said trough means adjacent said second side;

(c) a pump within said chamber to force sewage within said chamber through said discharge conduit.

16. A process for reclaiming sewage comprising:

(a) flowing sewage through a first elongated, substantially horizontal path;

(b) substantially preventing photosynthesis and aerobic micro-organism activity, while said sewage flows through said first path, to allow micro-organisms in said sewage which are active in the absence of free oxygen to decompose waste materials therein and thereby produce soluble products that serve as nutrient for the growth of algal cells through photosynthesis;

(c) flowing sewage effluent from said first path through a second elongated, substantially horizontal path adjacent said first path; said sewage in said first path and said sewage effluent in said second path being in indirect heat exchange relation with one another substantially throughout the lengths of said elongated paths; said flow in the two paths being in overall countercurrent relation to one another;

(d) exposing said sewage effluent throughout the length of said second path to light and free oxygen to allow micro-organisms therein which are active in the presence of free oxygen to decompose waste materials therein and to allow photosynthetic growth of algal cells in said sewage effluent; and (e) discharging algae-containing effluent from said second path.

17. The process of claim 16 wherein both of said elongated flow paths are serpentine paths.

18. The process of claim 16 wherein said sewage effluent in said second path, while flowing in heat exchange relation with said sewage in said first path, is buoyantly maintained upon said sewage in said first path.

References Cited

UNITED STATES PATENTS

| 2,867,945 | 1/1959 | Gotaas et al. | 210—2 X |
|---|---|---|---|
| 3,234,123 | 2/1966 | Hinde | 210—221 X |
| 3,260,368 | 7/1966 | Wagner et al. | 210—195 |
| 2,974,800 | 3/1961 | Fleischmann | 210—177 X |

FOREIGN PATENTS

| 235,872 | 1/1926 | Great Britain. |
|---|---|---|

MICHAEL E. ROGERS, *Primary Examiner.*